United States Patent [19]

Miyazaki et al.

[11] 3,988,880
[45] Nov. 2, 1976

[54] TEXTILE MACHINE PROVIDED WITH PRODUCT-CONVEYER MOUNTED THEREON

[75] Inventors: Tsutomu Miyazaki, Kariya; Takashi Kato, Toyota; Yoshihisa Suzuki, Nagoya; Shozo Ueda, Kariya, all of Japan

[73] Assignees: Daiwa Boseki Kabushiki Kaisha, Osaka; Kabushiki Kaisha Toyoda Jidoshokki Seisakusho, both of Japan

[22] Filed: Nov. 26, 1974

[21] Appl. No.: 527,502

[30] Foreign Application Priority Data

Nov. 29, 1973 Japan.............................. 48-134162
Nov. 29, 1973 Japan.............................. 48-134163
Dec. 3, 1973 Japan.............................. 48-135956
Dec. 4, 1973 Japan.............................. 48-135963

[52] U.S. Cl..................................... 57/34 R; 57/52; 198/382; 198/495
[51] Int. Cl.²........................................... D01H 9/00
[58] Field of Search ............... 198/82, 84, 102, 108, 198/135, 154, 159, 251, 229, 230; 15/306 A; 57/52, 53, 34 R, 34.5, 56

[56] References Cited
UNITED STATES PATENTS

| | | |
|---|---|---|
| 1,972,489 | 9/1934 | Rideout et al. .................... 198/251 |
| 2,354,360 | 7/1944 | Bigelow .......................... 198/102 X |
| 2,515,223 | 7/1950 | Hollick .............................. 15/306 A |
| 2,699,246 | 1/1955 | Harrison, Jr. et al............... 198/251 |
| 3,272,651 | 9/1966 | Quirk................................. 15/306 A |
| 3,788,054 | 1/1974 | Haussmann et al................. 57/52 X |
| 3,791,126 | 2/1974 | Kose et al................................ 57/53 |

*Primary Examiner*—John Petrakes
*Attorney, Agent, or Firm*—Burgess Ryan and Wayne

[57] ABSTRACT

A textile machine made by assembling a plurality of unit textile machines. Each unit textile machine is provided with a plurality of unit machines, and each unit machine is provided with a yarn package forming mechanism. Each unit textile machine is provided with a unit conveyer belt disposed along a longitudinal direction of the unit textile machine at a position adjacent to the yarn package forming mechanisms. When the unit textile machines are assembled as one body, their unit conveyer belts are aligned and form a combined conveyer belt. At least one step is provided between any two adjacent unit conveyer belts or a unit conveyer belt of a unit textile machine and an auxiliary conveyer belt mounted on a head stock of the assembled textile machine. So as to always maintain the assembled conveyer belt in a clean condition, a cleaning device may be disposed at a position between two adjacent unit conveyer belts.

7 Claims, 18 Drawing Figures

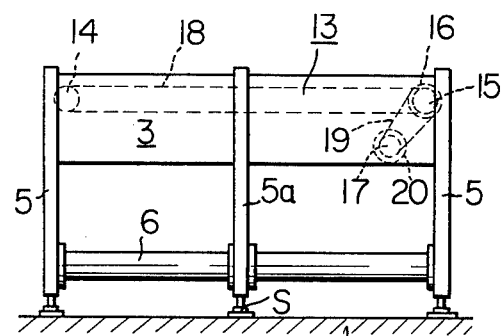
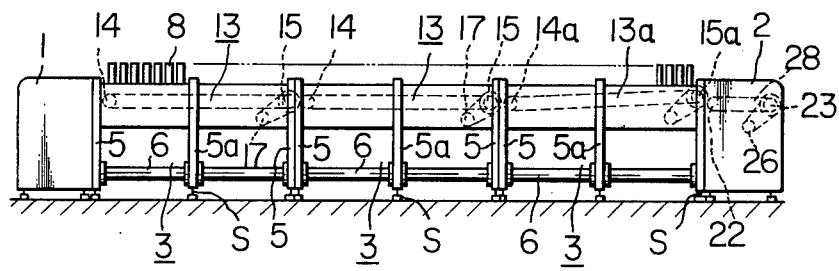
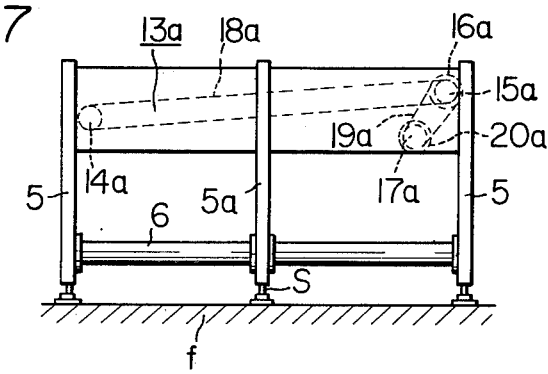

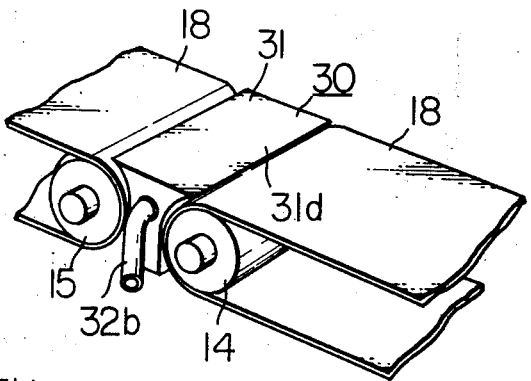
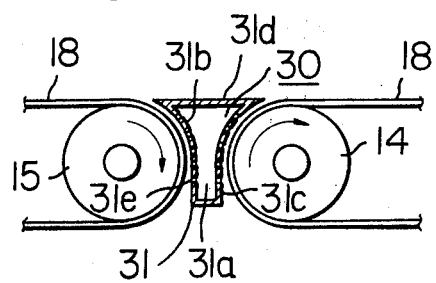
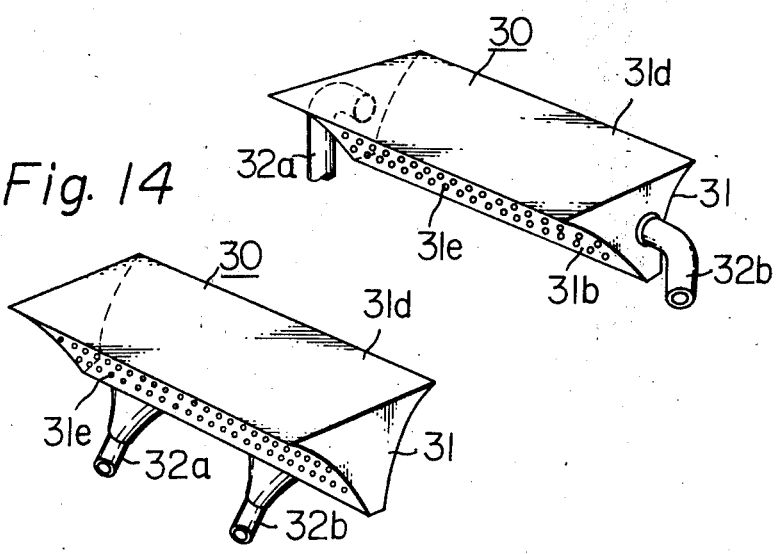

TEXTILE MACHINE PROVIDED WITH PRODUCT-CONVEYER MOUNTED THEREON

SUMMARY OF THE INVENTION

The prevent invention relates to a textile machine provided with a product-conveyor mounted thereon along a longitudinal direction thereof.

In the specification, the term "textile machine" represents a textile machine such as an open-end spinning machine provided with a plurality of spinning units or a rewinding machine provided with a plurality of rewinding units.

Recently, it has become a tendency to produce a textile machine composed of a plurality of unit machines, which are capable of being assembled as one body during installation of the textile machine, wherein each unit machine is provided with a plurality of machine units such as spinning units or rewinding units. In the above-mentioned textile machine, a main driving motor, a power transmission device and auxiliary instruments such as a device for controlling the operation of the machine units, etc., are disposed in head-stocks which are assembled at both side-ends of the textile machine so that an assembly of unit machines is sandwiched by the head-stocks. In the above-mentioned assembling of the unit machines, side frames of two adjacent unit machines are connected to each other and, consequently, transportation and assembling of the unit machines can be carried out conveniently.

It is also the latest tendency to provide a conveyer belt on a textile machine, such as an open-end spinning machine or rewinding machine, for carrying yarn packages doffed from each spinning unit or rewinding unit toward the outside of the machine. Therefore, if it is necessary to install the conveyer belt on the above-mentioned textile machine, the work of assembling the textile machine becomes complicated, because the conveyor belt extends along the lengthwise direction of the textile machine for entire length of the textile machine. Consequently, the above-mentioned advantages of utilization of unit machines cannot be expected.

The principal object of the present invention is to provide a textile machine wherein a plurality of unit machines are assembled and means for conveying products toward the outside of the textile machine is provided while maintaining the above-mentioned merits of the textile machine composed of a plurality unit machines.

It is a further object of the present invention to provide a textile machine provided with an improved conveyer belt having means for cleaning the conveyer belt and/or means for carrying products in a stable condition.

To attain the purpose of the present invention, the conveying means according to the present invention is a plurality of unit conveyers. Each unit conveyer is mounted on a unit machine along the lengthwise direction and is driven by a driving mechanism separately, and the conveyer belts of these unit machines are aligned so as to transfer the carried product from one conveyer belt to the next conveyer belt disposed at an adjacent downstream position. To assure a stable carrying condition of products by the assembled conveyer, at least one unit conveyer is installed in a slightly inclined condition in such a way that the downstream end of this unit conveyer is positioned above the upstream end of the successive unit conveyer belt. Further, means for cleaning the surface of these unit conveyer belts is provided. Therefore, the transportation and assembling operation of the unit machines of a textile machine can be carried out conveniently even though a product-conveying means is installed on the textile machine assembled with the above-mentioned plurality of unit maachines.

BRIEF EXPLANATION OF THE DRAWING

FIG. 4 is a schematic front view of a unit machine of the textile machine shown in FIG. 3.

FIG. 6 is a schematic front view of a modified textile machine according to the present invention.

FIG. 7 is a schematic front view of a unit machine of the textile machine shown in FIG. 6, wherein a unit conveyer is arranged in upwardly inclined condition toward downstream direction.

FIGS. 11 and 13 are perspective views of a cleaning device which is preferably used for the conveyer utilized for a textile machine, according to the present invention.

FIG. 12 is a side view of a portion between two adjacent unit conveyer belts, wherein the cross section of the cleaning device shown in FIG. 11 is shown.

FIG. 14 is a perspective view of a modified cleaning device utilized for the textile machine, according to the present invention.

DETAILED ILLUSTRATION OF THE INVENTION

Figure 1:
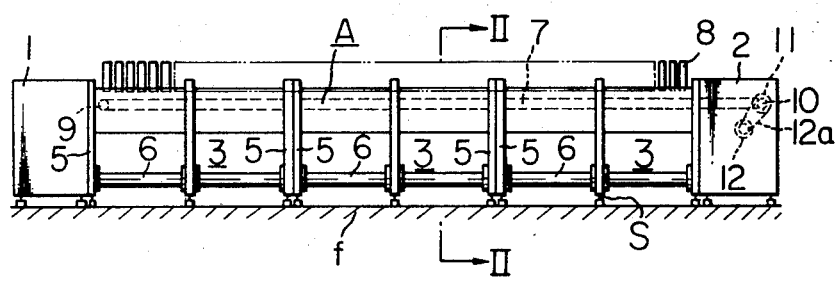
FIG. 1 is a schematic front view of a conventional textile machine assembled with a plurality of unit machines, provided with a conveyer belt extended along entire length of the textile machine.
Figure 2:
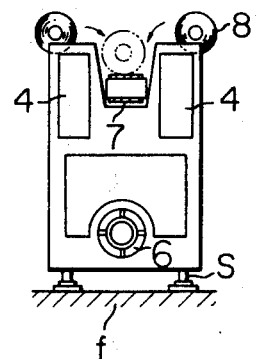
FIG. 2 is a schematic cross sectional view of the textile machine, taken along a line II—II in FIG. 1.

For the sake of better understanding of the present invention, a well known open-end spinning machine assembled with a plurality of unit machines is explained. Referring to FIGS. 1 and 2, the above-mentioned open-end spinning machine A comprises a pair of head stocks 1 and 2, wherein auxiliary devices (not shown) such as a main driving motor, a power transmission mechanism, a device for controlling the operation of machine units, etc., are disposed; a plurality of unit machines 3 are arranged between the head stocks 1 and 2, and; a conveyer belt 7 mounted on the open-end spinning machine A in such a condition that the conveyer belt 7 is disposed along the lengthwise direction of the spinning machine A for the entire length thereof. Each unit machine 3 comprises a plurality of conventional open-end spinning units, wherein each unit is provided with a take-up mechanism 4, arranged at front and back sides thereof and a pair of side frames 5, each provided with a smooth surface which is convenient for connecting two side frames 5. A horizontal connecting beam 6 is disposed at a lower portion of each unit machine 3 and is connected to both of the side frames 5. The head stocks 1 and 2, and unit machines 3 are installed on the floor f by way of the respective stands S. As shown in FIG. 2, the above-mentioned conveyer belt 7 is disposed at a position between the front side and rear side alignments of the spinning units 4 so as to be able to receive full size yarn packages 8 doffed from the spinning units 4. The above-mentioned conveyer belt 7 is mounted on a guide roller 9 turnably disposed on a unit machine 3 at a position adjacent to the head stock 1 and a driving pulley 10 mounted on a shaft disposed on the head stock 2. The shaft of the driving roller 10 is provided with a guide pulley 11 which is driven by a small pulley mounted on a shaft of a motor 12 by way of an endless belt 12a.

In the above-mentioned assembly of unit machines 3, the conveyer belt 7 extends for almost the entire length of the spinning machine A. Consequently, the above-mentioned assembling of the plurality of unit machines eliminated the large benefit resulting from utilization of the unit machines.

Figure 5:
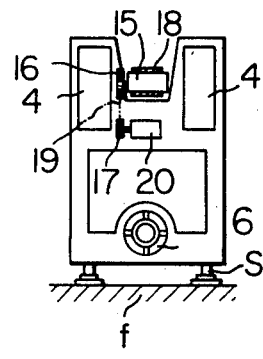
FIG. 5 is a schematic side view of a unit machine of the textile machine shown in FIG. 3.
Figure 3:
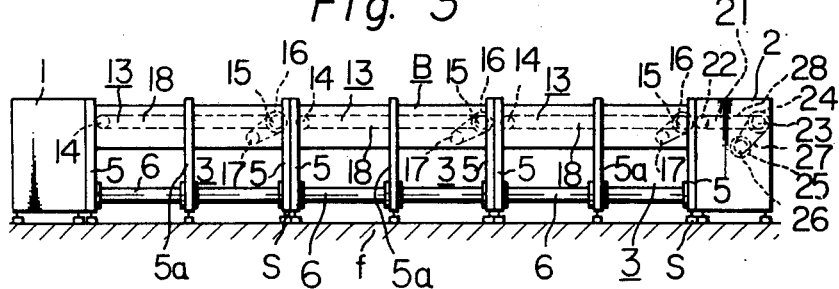
FIG. 3 is a schematic front view of a textile machine according to the present invention.

Referring to FIGS. 3, 4 and 5, a first embodiment of the textile machine according to the present invention is hereinafter illustrated. For the sake of simplification of the explanation, the elements of the textile machine according to the present invention which are similar to those of the above-mentioned conventional textile machine are hereinafter represented by identical reference numerals as used for the above-mentioned conventional textile machine.

The textile machine B shown in FIG. 3 is an open-end spinning machine provided with a plurality of conventional open-end spinning units. The textile machine B comprises a pair of head stocks 1 and 2 and three sets of unit machines 3 which are provided with a plurality of conventional open-end spinning units, respectively, wherein each spinning unit is provided with a take-up mechanism 4, and each unit machine is provided with means for conveying yarn packages toward the outside of the machine B. A horizontal connecting beam 6 is disposed at a lower position of each unit machine 3 so as to connect the three unit machines 3. Each unit machine 3 is stably constructed with a pair of side frames 5 and an intermediate frame 5a, disposed at an intermediate position between the side frames 5, and these frames 5 and 5a are stably connected by the connecting beam 6. The side surface of each side frame 5 is smooth so that the connection between two side frames 5 of adjacent unit machines 3 can be perfectly made. The above-mentioned connection of adjacent side frames 5 and also the connection of the connecting beams 6 of two adjacent unit machines are accomplished by utilizing conventional fastening elements such as bolts and nuts (not shown).

In the above-mentioned embodiment, each unit machine 3 is provided with a unit conveyer belt 13 disposed along a lengthwise direction of the unit machine 3 at a position between two aligned take-up mechanisms 4 of the open-end spinning units. The unit conveyer belt 13 comprises a guide roller 14 turnably mounted on the unit machine 3 at a longitudinal end portion thereof and a driving roller 15 turnably mounted on the unit machine 3 at the other longitudinal end portion thereof, a driving motor 20 mounted on the unit machine 3 at a position below the roller 15, a pulley 17 secured to a shaft of the driving motor 20, a pulley 16 secured to a shaft of the driving roller 15, an endless driving belt 19 mounted on the pulleys 16 and 17, and an endless belt 18 mounted on the rollers 14 and 15. The conveyor belts 13 of these unit machines 3 are arranged so as to be in an alignment when these unit machines 3 are assembled as one body.

To carry the yarn packages from the open-end spinning machine B toward the outside thereof, an auxiliary conveyer 21 is mounted on the head stock 2 as shown in FIG. 3, at the same level as the unit conveyer belt 13 so as to receive the yarn packages from the last unit conveyer 13. The auxiliary converyer 21 comprises a guide roller 22 and a driving roller 23 which are turnably mounted on the head stock 2, a driving motor 25 mounted on the head stock 2 at a position below the roller 23, pulleys 24 and 26 secured to a shaft of roller 23 and a shaft of the driving motor 25, respectively, an endless driving belt 27 mounted on the pulleys 24 and 26, and an endless belt 28 mounted on the rollers 22 and 23.

In the above-mentioned embodiment, the assembled conveyer belt is disposed along the lengthwise direction of the open-end spinning machine B at a position between two (front and back) alignments of take-up mechanisms. However, if the above-mentioned take-up mechanisms are disposed at a lower portion of the machine B, the above-mentioned assembled line of unit conveyer belts 13 may be disposed at a lower position on the machine B where the yarn packages doffed from the take-up mechanisms can be carried in good condition. As mentioned above, the assembled conveyer belt, that is, each unit conveyer belt according to the present invention, may be arranged at any position on the unit machine where the yarn packages doffed from the responsive take-up mechanisms can be carried in good condition.

In the above-mentioned embodiment of the open-end spinning machine, the unit conveyer belts 13 are driven by the respective driving motors 20 in substantially synchronous condition.

According to our experience in the mill operation of the above-mentioned embodiment shown in FIG. 3, some yarn packages are carried by the conveyer belt in an unstable condition. For example, if the yarn package is formed in the shape of a round flat cheese, wherein the diameter of the cheese is much larger than the width of the bobbin used for making the cheese, if the yarn package is laid on the conveyer belt in such a condition that only the cylindrical surface-side of the yarn package is in contact with the conveyer belt, the yarn package may or may not fall over while it is being transported on the conveyer belt. If the yarn packages 8 carried by the assembled conveyer belt are in different carrying conditions after leaving the end of the conveyer belt, the operation for receiving the yarn packages by a successive transportation carrier cannot be carried out perfectly. Therefore, it is desirable that all the yarn packages 8 be in the same stable condition after leaving the end of the assembled conveyer belt.

Figure 8:
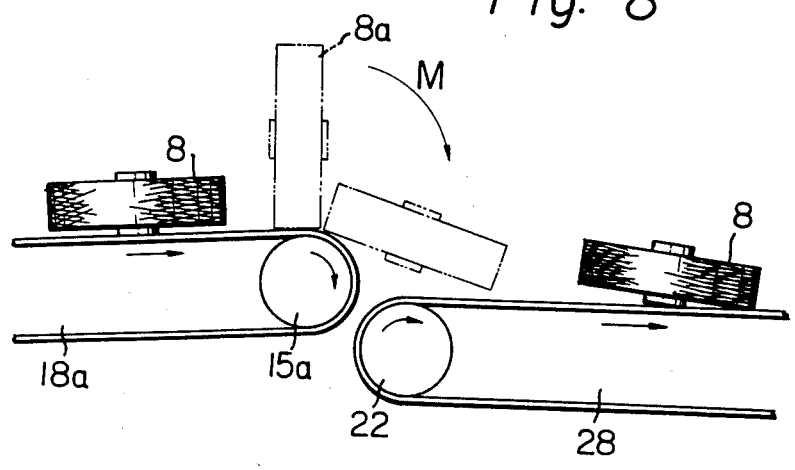
FIG. 8 is an explanatory side view of portions of two adjacent unit conveyers shown in FIG. 6, wherein one of the unit conveyers is arranged in an upwardly inclined condition toward downstream direction.

The embodiment shown in FIG. 6 is provided with a modified assembled conveyer belt to solve the above-mentioned problem concerning the carrying condition of the yarn packages 8. The open-end spinning machine shown in FIG. 6 has a construction similar to the embodiment shown in FIG. 3, except for a unit conveyer belt 13a mounted on a unit machine connected to the head stock 2. Therefore, only the unit conveyer belt 13a and its relationship to the conveyer belt mounted on the head stock 2 are hereinafter explained. Referring to FIGS. 6, 7 and 8, the unit conveyer 13a comprises a guide roller 14a turnably mounted on the unit machine 3 and a driving roller 15a turnably mounted on the unit machine 3 at a level which is a little higher than the guide roller 14a. Therefore, the endless belt 18a is slightly inclined upward toward the driving roller 15a. In this modification, the other elements similar to the elements of the unit conveyer 13 are represented by the same reference numeral as the unit conveyer 13 but identified with a suffix a. The effective function of such combination of an inclined unit conveyer belt 13a with the horizontal conveyer belt such as the conveyer mounted on the head stock 2 or the unit conveyer 13 is hereinafter explained with reference to FIG. 8. If a yarn package 8a is carried by the conveyer belt 18a to a downstream terminal of the conveyer belt 18a in a condition that only the cylindrical surface-side of the yarn package 8a is in contact with the conveyer belt 18a, the yarn package 8a falls when it is transferred to the conveyer belt 28 of the successive unit conveyer belt because of a step formed between the two adjacent conveyer belts. This condition is represented by an arrow M. However, the yarn package 8, which is carried by the endless belt 18a in a fallen condition, is transferred from the endless belt 18a to the successive endless belt 18 in the same fallen condition. It can be easily understood that if the yarn package 8 is carried by the conveyer belt in the above-mentioned fallen condition, the transportation of the yarn packages 8 can be carried out stably.

Figure 9:
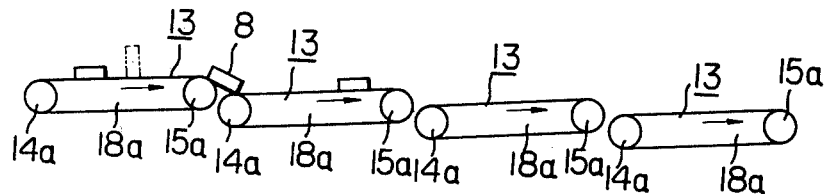
FIG. 9 is a schematic side view of another embodiment of the assembled conveyer utilized for a textile machine, comprising a plurality of unit conveyer belts, wherein each unit conveyer belt is arranged in an upwardly inclined condition toward downstream direction, according to the present invention.
Figure 10:
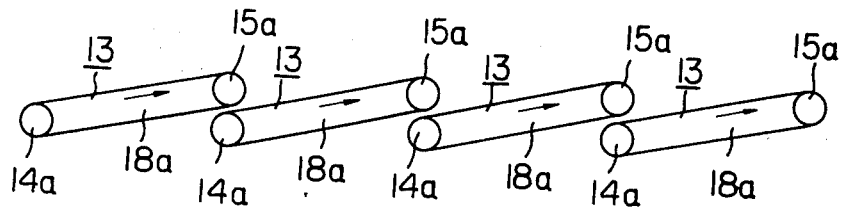
FIG. 10 is a schematic side view of a modification of the assembled conveyer, wherein an end portion of each unit conveyer belt is positioned above a leading portion of a successive unit conveyer belt, according to the present invention.

Several modifications of the arrangement of unit conveyer belts 13 are shown in FIGS. 9 and 10. In these embodiments, all unit conveyer belts 13 are inclined conveyer belts having the same construction as shown in FIG. 7. The assembled conveyer belt shown in FIG. 9, is provided with a step between each two adjacent unit conveyer belts 13 and, therefore, the same functional effect as with the embodiment shown in FIG. 8 can be expected. In the assembled conveyer belt shown in FIG. 10, each driving roller 15a of an upstream unit conveyer belt 13 is positioned immediately above each guide roller 14a of an adjacent downstream unit conveyer belt 13. However, the same functional effect as with the embodiment shown in FIG. 9 can be expected.

According to our experience in mill operation, since dust or flies of cotton fibers are deposited on the above-mentioned conveyer belt during the spinning operation, it is required to clean the carrying surface of the conveyer belt. If such cleaning is not effected the yarn packages 8 are soiled or the flies of cotton fibers adhere on the yarn surface of the packages 8. To always maintain the carrying surface of the assembled conveyer belt in a clean condition, a cleaning device is disposed between two adjacent unit conveyer belts 13.

Referring to FIGS. 11, 12 and 13, a cleaning device 30, utilized for the assembled conveyer belt according to the present invention, comprises a hollow member 31 provided with a suction chamber 31a therein and a pair of connection pipes 32a, 32b which connect the suction chamber 31a with a suction source (not shown). The hollow member 31 is provided with a pair of accurate walls 31b and 31c, which are capable of closely facing the endless belts 18 at the facing positions of a driving roller 15 and a guide roller 14 as shown in FIG. 12 when the cleaning device 31 is disposed in a space between two adjacent unit conveyer belts 13, and also is provided with a flap top plate 31d. The accurate side walls 31b, 31c are provided with numerous apertures 31e. The cleaning device 31 is disposed in the space between two adjacent unit conveyer belts 13 in such a condition that the flap top plate 31d is positioned at the same level as the carrying surface of the unit conveyer belts 13 and the side walls 31b, 31c are closely facing the endless belt 18 as mentioned above. Consequently, dust or flies adhered to the carrying surface of the endless belts 18 are taken therefrom and sucked into the suction chamber 31a of the cleaning device 31 through the apertures 31e, and then carried to the suction source (not shown). Accordingly, the carrying surface of each unit conveyer belt 13 can be always maintained in a clean condition.

A modification of the cleaning device 30 utilized for the unit conveyer 13 according to the present invention is shown in FIG. 14. The construction and function of this cleaning device is quite similar to the device shown in FIG. 13, except for the disposition of the connection pipes 32a and 32b.

Figure 15:
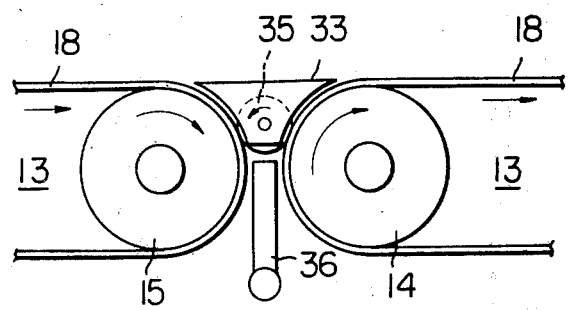
FIG. 15 is a schematic side view of a portion of the adjacent unit conveyer belts, which is applicable for the textile machine according to the present invention, wherein a device for cleaning the unit conveyer belts is shown.
Figure 16:
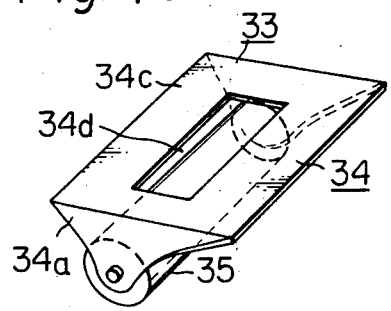
FIG. 16 is a perspective view of the cleaning device shown in FIG. 15, wherein a clearer rotatably mounted on the device is shown.
Figure 17:
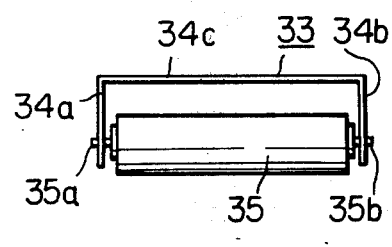
FIG. 17 is a front view of the cleaning device shown in FIG. 16.

Another embodiment of the cleaning device utilized for the present invention is shown in FIGS. 15, 16 and 17. In this embodiment, the cleaning device 33 comprises a clearer supporting member 34 and a clearer 35 turnably supported by the member 34. The cleaning device 33 is disposed at a space between two adjacent unit conveyer belts 13 in such a condition that a top place 34c of the member 34 is positioned at the same level as the carrying surface of the unit conveyer belts 13 and a clearer 35 is always capable of contacting the endless belts 18 of the unit conveyer belts 13 as shown in FIG. 15. Dust or flies transferred from the endless belts 18 to the clearer 35 are taken therefrom by a suction nozzle 36, which is provided with an aperture positioned close to and facing the clearer 35, and this suction nozzle 36 is connected to a suction source (not shown). The clearer 35 is a roller covered with a cleaning cloth and turnably supported by a pair of supporting legs 34a and 34b extended downward from the top place 34c of the supporting member 34. The top place 34c is provided with an aperture 34d to allow observation of the surface condition of the clearer 35.

Figure 18:
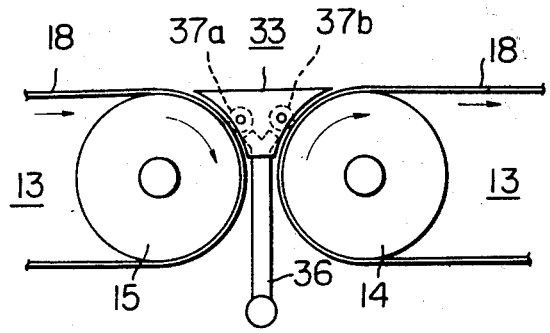
FIG. 18 is a schematic side view of a portion of two adjacent unit conveyer belts provided with a modified cleaning device, according to the present invention.

In a modification of the above-mentioned embodimenet of the cleaning device 33 shown in FIG. 15, a pair of clearers 37a and 37b, as shown in FIG. 18, may be used instead of the single clearer 35. In this modification, a pari of apertures are formed in the suction nozzle 36 so as to remote dusts or flies from the cleaners 37a, 37b which always contact the surface of the respective endless belts 18.

In the above-mentioned embodiments of the present invention, the textile machine involved is an open-end spinning machine. However, other types of textile machines, such as a rewinding machine provided with a plurality of unit machines and each unit machine provided with a plurality of rewinding units, is also the subject matter of the present invention.

As already explained in detail, the transportation to and assembling operation at a place where the textile machine is to be installed, can be easily carried out with high efficiency according to the application of the present invention.

What is claimed is:

1. In a textile machine made by asembling a plurality of unit machines as one body in an aligned condition; each unit machine provided with a plurality of machine units, each machine unit provided with a package forming mechanism; assembled unit machines sandwiched by a pair of head stocks; said textile machine provided with a main driving motor and a power transmission mechanism and other auxiliary devices mounted on one of said head stocks and means for conveying yarn packages doffed from said package forming mechanisms toward the outside of said textile machine, an improvement comprising each machine unit being provided with a separate unit conveyor belt disposed along a longitudinal direction of said unit at a position adjacent to said package forming mechanisms, all of said unit conveyer belts arranged in alignment when said unit textile machines are assembled, so that a straight assembled conveying means is formed on said textile machine, each of said unit conveyer belts comprising a guide roller and a driving roller mounted thereon and an endless belt mounted on said guide roller and said driving roller, means for rotating said driving roller, an auxiliary conveyer belt mounted on one of said head stocks, said auxiliary conveyor belt positioned at the outside of the downstream terminal of said assembled conveyor means and aligned in substantially the same direction as said unit conveyor belts.

2. An improved textile machine provided with a conveying means for yarn packages according to claim 1, wherein at least in said unit conveyer belt of said unit textile machine adjacent to said auxiliary conveyer belt, said endless belt is inclined upward toward said driving roller of said unit conveyer belt, whereby a step is formed at a position between a downstream terminal of said inclined endless belt and a leading terminal of said endless belt of said anxiliary conveyer belt.

3. An improved textile machine provided with a conveying means for yarn packages according to claim 1, wherein each unit conveyer belt is provided with an inclined endless belt inclined upward toward said driving roller, said guide rollers of all of said unit conveyer belts are positioned at an identical level so that a step is formed between each two adjacent unit conveyer belts.

4. An improved textile machine provided with a conveying means for yearn packages according to claim 3, wherein said driving roller of each unit conveyer belt is positioned right above and in substantial vertical alignment with said guide roller of the successive unit conveyer belt.

5. An improved textile machine provided with a conveying means for yarn packages according to claim 1, further comprising a cleaning device disposed at a working position between two adjacent unit conveyer belts.

6. An improved textile machine provided with a conveying means for yarn packages according to claim 5, wherein said cleaning device comprises a hollow member provided with a pair of arched side walls closely facing the ends of adjacent unit conveyer belts and a suction pipe connecting the inside of said hollow member with a suction source, said side walls of said hollow member are provided with numberous apertures, said hollow member is provided with a top place capable of being positioned at the same level as the carrying surfaces of two adjacent unit conveyer belts when said cleaning device is disposed at said working position thereof.

7. An improved textile machine provided with a conveying means for yarn packages according to claim 5, wherein said cleaning device comprises at least one clearer disposed in contact condition with saidd endless belts of said two adjacent unit conveyer belts, and a member for rotatably supporting said clearer, and a suction nozzle disposed below said clearer in such a condition that a suction aperture of said suction nozzle closely faces said clearer, said suction nozzle being connected to a suction source.

* * * * *